United States Patent [19]

Fujiwara et al.

[11] 4,351,572
[45] Sep. 28, 1982

[54] TRACK ROLLER SUSPENSION APPARATUS FOR A TRACK-TYPE VEHICLE

[75] Inventors: Yasuo Fujiwara; Hidemi Maeo; Eiichi Muramoto, all of Hirakata, Japan

[73] Assignee: Kabushiki Kaisha Komatsu Seisakusho, Tokyo, Japan

[21] Appl. No.: 147,282

[22] Filed: May 6, 1980

[30] Foreign Application Priority Data

May 11, 1979 [JP] Japan .................. 54/57013

[51] Int. Cl.³ .......................................... B62D 55/16
[52] U.S. Cl. ......................................... 305/27; 305/28
[58] Field of Search ..................... 305/21, 22, 27, 28, 305/56; 105/180, 209, 218 A; 267/21 R, 21 A; 280/681, 687; 308/21

[56] References Cited

U.S. PATENT DOCUMENTS

| 125,796 | 4/1872 | Dudley | 267/21 R |
|---|---|---|---|
| 1,469,997 | 10/1923 | Cornwall | 105/218 A |
| 3,826,325 | 7/1974 | Purcell et al. | 305/22 X |
| 4,013,016 | 3/1977 | Willets | 280/687 X |
| 4,097,093 | 6/1978 | Shelby et al. | 305/22 |

FOREIGN PATENT DOCUMENTS

| 146854 | 8/1936 | Austria | 305/27 |
|---|---|---|---|
| 631380 | 11/1978 | U.S.S.R. | 305/28 |

Primary Examiner—Randolph A. Reese
Attorney, Agent, or Firm—Armstrong, Nikaido, Marmelstein & Kubovcik

[57] ABSTRACT

A track roller suspension apparatus for a track-type vehicle having a track frame and a track assembly mounted on the track frame, which includes a shaft rotatably mounted on the track frame, a first arm rotatably mounted on the shaft, a second arm rotatably mounted on the shaft, the first and second arms being arranged crossing each other, and a pair of track rollers each mounted on the respective arms. Resilient pads are disposed between the first and second arms to absorb shock loads.

3 Claims, 30 Drawing Figures

TRACK ROLLER SUSPENSION APPARATUS FOR A TRACK-TYPE VEHICLE

BACKGROUND OF THE INVENTION

This invention relates to a track roller suspension apparatus for a track-type vehicle.

In a conventional system, it is well known to provide track rollers in rolling contact with the inner periphery of a track of a track-type vehicle, such track rollers making up part of an overall vehicle suspension system. In general, such track rollers define channels in their outer peripheries which engage with inwardly protruding portions of the track, so that the track tends to be laterally positioned relative to track rollers as the track moves relative to the track rollers.

An improved track roller suspension apparatus is disclosed in U.S. Pat. No. 4,097, 093, in which track rollers are flexibly or resiliently mounted on a track frame, allowing the loads from the track to be reduced or absorbed efficiently. While the apparatus of the above patent has proved relatively effective in operation, it is to be understood that under certain conditions loads reducing rate of the apparatus is not high enough for flexible mounting.

SUMMARY OF THE INVENTION

It is therefore an object of the present invention to provide a track roller suspension apparatus for a track-type vehicle which can effectively reduce loads or shock loads from a track of the vehicle even if such loads are imposed entirely on one of a pair of track rollers.

Another object of the present invention is to provide an improved track roller suspension apparatus for a track-type vehicle which can enhance operability of the vehicle.

In accordance with an aspect of the present invention, a track roller suspension apparatus is provided for a track-type vehicle having a track frame and a track assembly mounted on the track frame, said apparatus comprising: shaft means rotatably mounted on said track frame; first arm means rotatably mounted on said shaft means, said first arm means having a roller mounting lower section and an upper section; second arm means rotatably mounted on said shaft means, said second arm means having a roller mounting lower section and an upper section, said first and second arm means being arranged crossing each other; first roller means rotatably mounted on the roller mounting lower section of said first arm means; and second roller means rotatably mounted on the roller mounting lower section of said second arm means.

The above and other objects, features and advantages of the present invention will be readily apparent from the following description taken in conjunction with the accompanying drawings.

DETAILED DESCRIPTION OF THE INVENTION

The present invention will now be described in detail with reference to the accompanying drawings. Before describing the present invention, however, the prior art systems will first be described with reference to the accompanying drawings since further description of the prior art system in considered essential for the better understanding of the features and advantages of the present invention.

Figure 1:
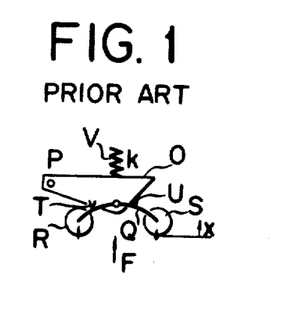
FIGS. 1 to 3 are schematic explanational views of a prior art track roller suspension system wherein loads are evenly imposed on two rollers in FIG. 1 and full loads are imposed on a single roller but different ones in FIGS. 2 and 3.

FIG. 1 shows schematically the system disclosed in U.S. Pat. No. 4,097,093 which comprises an arm O adapted to pivot about a fulcrum P and having a leg member Q pivotally mounted thereto, said leg member Q having rollers R and S rotatably carried at both ends thereof, and a spring V resiliently connected between the arm O and a track frame.

In the first case, when a load F is exerted uniformly on the rollers R and S as shown in FIG. 1, the following relative equation is applicable.

$$F = kx \text{ (k:spring constant, x: stroke)}$$

Figure 2:
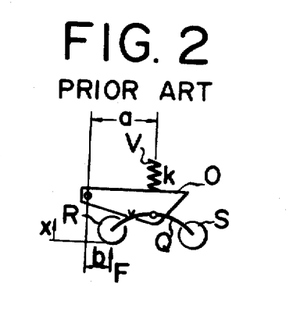

In the second case, when the load F is exerted only on the roller R as shown in FIG. 2, the following relative equation is aplicable.

$$F = (a/b)^2 kx$$

Figure 3:
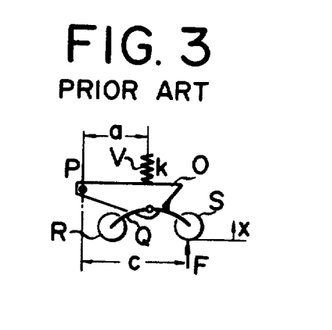

In the third case, when the load F is exerted only on the roller S as shown in FIG. 3, the following equation is applicable.

$$F = (a/c)^2 kx$$

As can be seen from FIGS. 2 and 3, in the case where the balance effect is unavailable, or only one roller is subjected to a load, the load reduction rate varies because of difference in sring constant. In the case of the arrangement shown in FIG. 2, if the spring constant "k" is set at a proper value to achieve a sufficient load reduction, it will be too small for the other two cases thereby giving a bad influence on the operability of the vehicle.

The quantitative explanation of the foregoing will now be made hereinbelow.

1. Load F exerted only on roller S as shown in FIG. 3 (wich is referred to as "case 3" below.)

Figure 4:
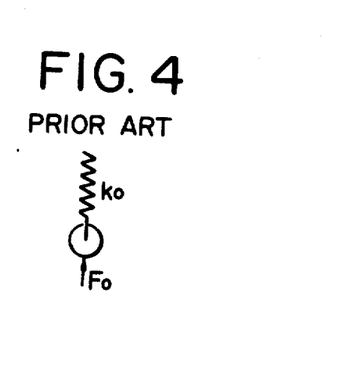
FIG. 4 is a schematic explanational view of a prior art rigid suspension.
Figure 5A:
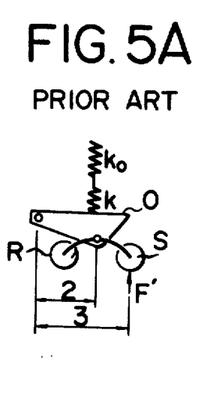
FIGS. 5A to 5C are schematic explanational views of a prior art flexible suspension system wherein loads are imposed on one of the rollers.
Figure 5B:
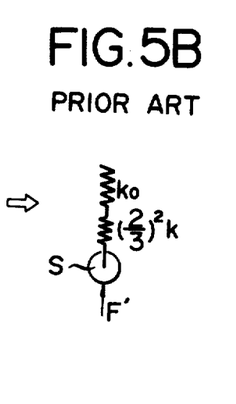
Figure 5C:
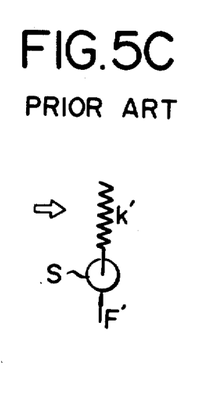

A prior art rigid suspension system is shown in FIG. 4, while flexible suspension systems are shown in FIGS. 5A, 5B and 5C.

$$F_o = \sqrt{2 k_o E}$$

$$F = \sqrt{2 k'E}$$

The vriables $k_o$ and $F_o$ are a spring constant and a load, respectively, in the case of the rigid suspension system. The variables k' and F' are a spring constant and a load, respectively, in the case of the flexible suspension system. E is an impact energy. The suspension system of FIG. 5A is equivalent to these of FIGS. 5B and 5C. The spring constant in the arrangement of FIG. 5C is k' which is the spring constant of the flexible suspension system.

The following equation is obtained from FIGS. 5B and 5C.

$$k' = \frac{1}{\frac{1}{k_o} + \frac{1}{(\frac{a}{b})^2 k}} = \frac{(\frac{a}{b})^2 k k_o}{(\frac{a}{b})^2 k + K_o} \quad \text{①}$$

$$\frac{F}{F_o} = \sqrt{\frac{k'}{k_o}}$$

From the equation ①, the following equation can be derived.

$$\frac{F}{F_o} = \sqrt{\frac{(\frac{a}{b})^2 k}{(\frac{a}{b})^2 k + k_o}} = \alpha$$

α is a load reduction rate of the flexible suspension relative to the rigid suspension.

$$(\tfrac{a}{b})^2 k = \alpha^2 (\tfrac{a}{b})^2 k + \alpha^2 k_o$$

$$\therefore k = \frac{\alpha^2}{(\tfrac{a}{b})^2 (1 - \alpha^2)} k_o$$

Substitution of α=0.7 which is a load reduction rate considered to be enough from the empirical rule in the above equation gives the following equation.

$$k = 2.16 k_o \quad \text{②}$$

$$F = 0.7 F_o$$

2. Load F exerted only on roller R as shown in FIG. 2 (which is referred to as "case 2" below.)

Figure 6:
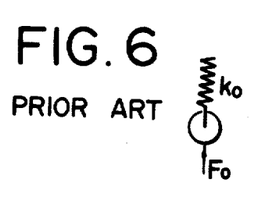
FIG. 6 is a schematic explanational view of a prior art rigid suspension.
Figure 7A:
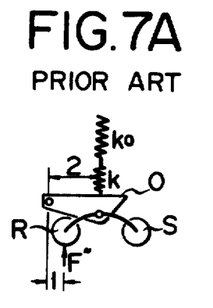
FIGS. 7A to 7C are similar to FIGS. 5A to 5C but showing loads being imposed on another prior art roller.
Figure 7B:
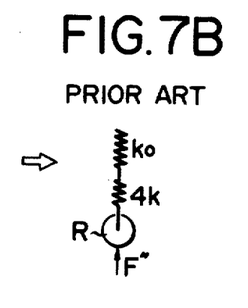
Figure 7C:
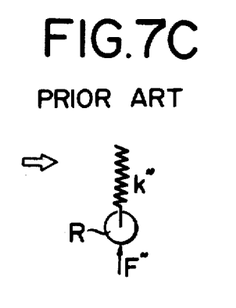

A rigid suspension system is shown in FIG. 6, while flexible suspension systems are shown in FIGS. 7A, 7B and 7C.

$$\frac{F'}{F_o} = \sqrt{\frac{k''}{k_o}}$$

The variables k'' and F'' are a spring constant and a load, respectively, in the case of the flexible suspension system. The suspension system of FIG. 7A is equivalent to those of FIGS. 7B and 7C.

From FIGS. 7B and 7C, the following equation is obtained.

$$k'' = \frac{1}{\frac{1}{k_o} + \frac{1}{4k}} = \frac{4 k k_o}{4k + k_o} \quad \text{③}$$

$$\frac{F'}{F_o} = \sqrt{\frac{4k}{4k + k_o}}$$

Substitution of the equation ② in the above equation gives the following equation.

$$F' = 0.947 F_o$$

3. Load F exerted uniformly on rollers R and S as shown in FIG. 1 (which is referred to as "case 1" below.)

Figure 8:
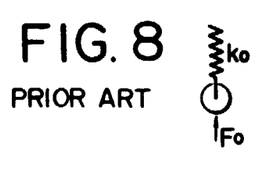
FIG. 8 is a schematic explanational view of a prior art rigid suspension.
Figure 9A:
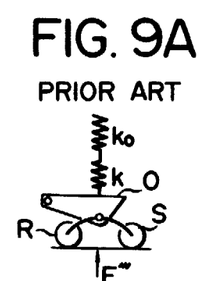
FIGS. 9A and 9B are schematic explanational views of a prior art flexible suspension system wherein loads are evenly imposed on both rollers.
Figure 9B:
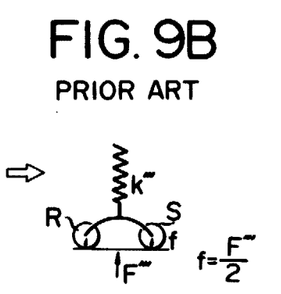
Figure 10:
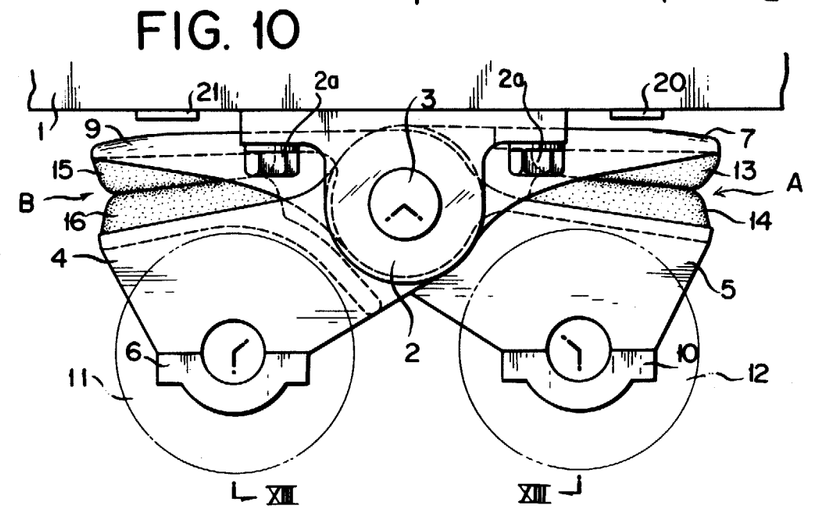
FIG. 10 is a front elevational view of a lower track roller mounting apparatus according to the present invention.
Figure 11:
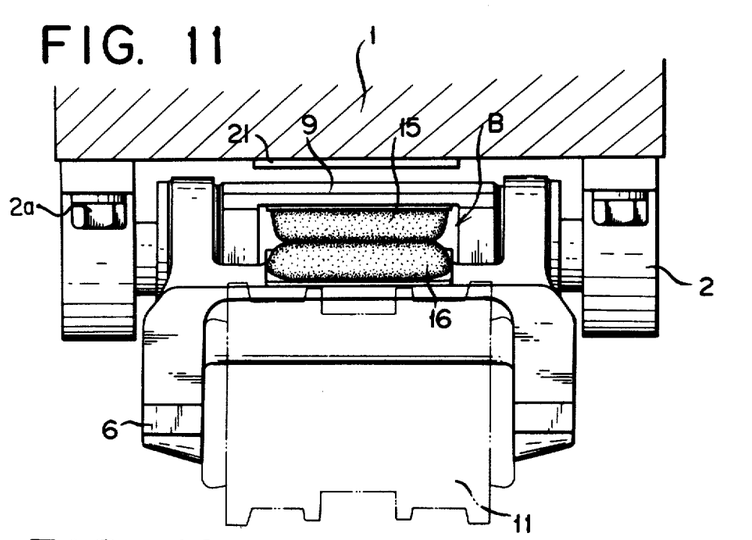
FIG. 11 is a side elevational view of the apparatus shown in FIG. 10.
Figure 12:
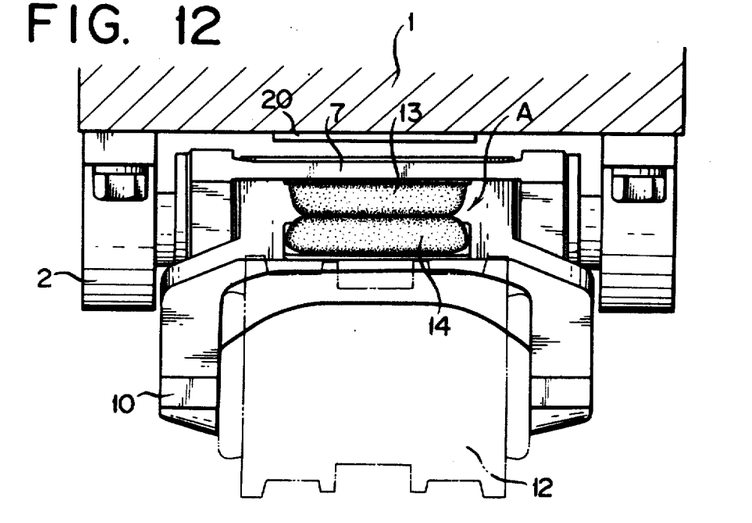
FIG. 12 is similar to FIG. 10 but showing another side of the apparatus.
Figure 13:
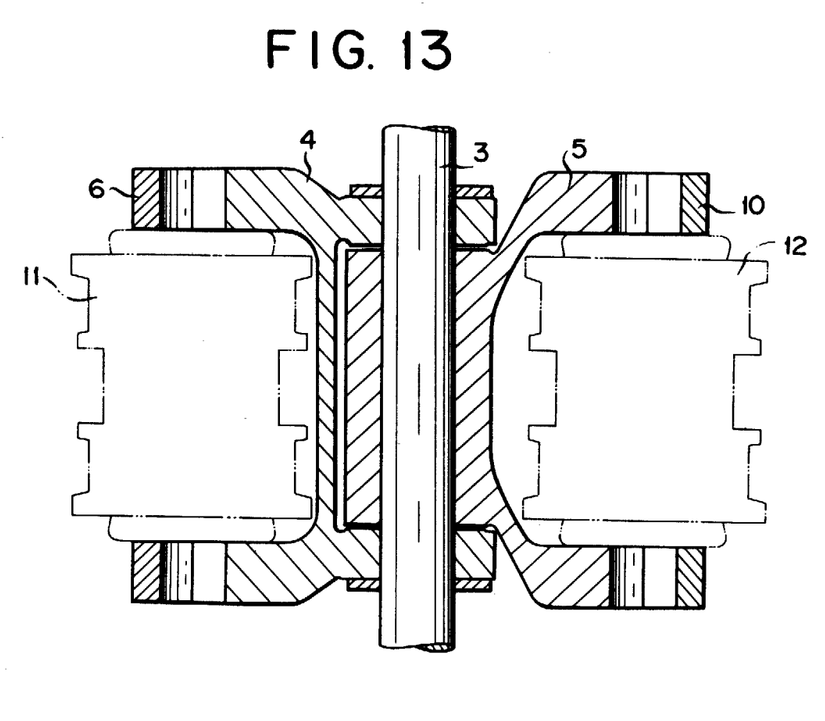
FIG. 13 is a cross-sectional view taken along the line XIII—XIII of FIG. 10.
Figure 14:
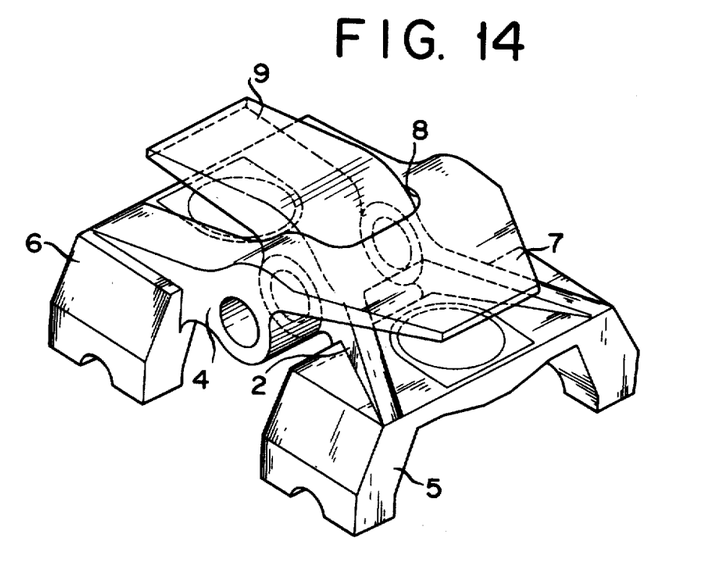
FIG. 14 is a perspective view of the track roller suspension apparatus shown in FIG. 10 with some components being omitted.

A rigid suspension system is shown in FIG. 8, while flexible suspension systems are shown in FIGS. 9A and 9B.

$$\frac{F''}{F_o} = \sqrt{\frac{k'''}{k_o}}$$

The variables k''' and F''' are a spring constant and a load, respectively, in the case of the flexible suspension system.

Since the suspension system of FIG. 9A can be set to be equivalent to that of FIG. 9B, the following equation is obtained.

$$k''' = \frac{1}{\frac{1}{k_o} + \frac{1}{k}} = \frac{k k_o}{k + k_o} \quad \text{④}$$

$$\frac{F''}{F_o} = \sqrt{\frac{k}{k + k_o}}$$

Substitution of the equation ② in the above equation gives the following equation.

$$F'' = 0.827 F_o$$

Therefore, the load exerted on either one of the rollers R and S will be as follows.

$$f = 0.413 F_o$$

Referring now to FIGS. 10 to 14 which show a lower track roller suspension system according to the present invention, reference numeral 1 denotes a track frame, the lower surface of which has a bearing member 2 fixedly secured thereto by means of bolts 2a, the bearing member 2 having a shaft pin 3 rotatably mounted thereto.

Arm members 4 and 5 are attached to the shaft pin 3 so that they can oscillate. The arm member 4 has a roller mounting portion 6 formed in one end thereof and an upper carrier portion 7 formed in the other end thereof. The arm member 4 has an opening 8 formed in the approximately central part thereof.

The arm member 5 has an upper carrier portion 9 formed in one end thereof and a roller mounting portion 10 formed in the other end thereof.

The carrier portion 9 of the arm member 5 extends through the opening 8 of the arm member 4 and is located above the roller mounting portion 6 thereof. The carrier portion 7 of the arm member 4 is located above the roller mounting portion 10 of the arm member 5.

The roller mounting portions 6 and 10 of the arm members 4 and 5 have rollers 11 and 12 rotatably mounted thereto.

Fixedly secured to the carrier portion 7 of the arm member 4 is a rubber pad 13, while fixedly secured to the upper surface of the roller mounting portion 10 of the arm member 5 is a rubber pad 14. The rubber pads 13 and 14 abut against each other and form a resilient member A.

Fixedly secured to the carrier portion 9 of the arm member 5 is a rubber pad 15, while fixedly secured to the upper surface of the roller mounting portion 6 of the arm member 4 is a rubber pad 16. The rubber pads 15 and 16 abut each other and form a resilient member B.

Fixedly secured to the track frame 1 are stoppers 20 and 21. The arrangement is made such that, when only one of the track rollers 11, 12 which is in rolling contact with the track frame 1 is subjected to the load, the corresponding arm's carrier portion 7 or 9 will strike against the stopper 20 or 21.

Figure 15:
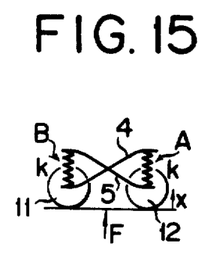
FIGS. 15 to 17 are schematic explanational views of a track roller suspension system of the present invention wherein loads are evenly imposed on two rollers in FIG. 15 and full loads are imposed on a single roller but different ones in FIGS. 16 and 17, respectively.
Figure 16:
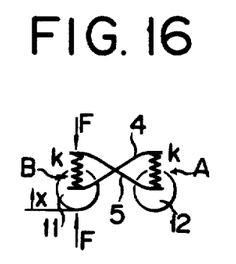
Figure 17:
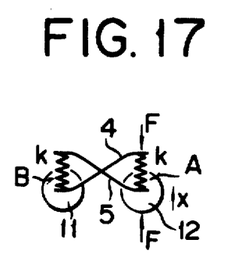

The roller suspension systems thus constructed and including resilient members A and B having a spring constant K are schematically shown in FIGS. 15 to 17.

In the case the load F is exerted uniformly on the rollers 11 and 12, the following relative equation is applicable.

$$F = 8kx \quad \text{(k: spring constant, x: stroke)}$$

In the case the load F is exerted only on the roller 11 as shown in FIG. 16, the following relative equation is applicable.

$$F = 2kx$$

Similarly, when the load F is exerted only on the roller 12 as shown in FIG. 17, the following relative equation is applicable.

$$F = 2kx$$

In view of the foregoing, where only one roller is subjected to the load F, an equivalent load reduction effect can be obtained because of having a symmetrical configuration and an equal spring constant.

Further, if the spring constant k is set at a value to achieve a sufficient load reduction when only one roller is subjected to the load F, the spring constant will not reduce appreciably even when the two rollers are subjected to the load, thereby giving little influence on the operability of the vehicle.

The quantitative explanation of the foregoing will now be made hereinbelow.

5. Load exerted uniformly on the (which are referred to as "case 2" and "case 3" below.)

Figure 18:
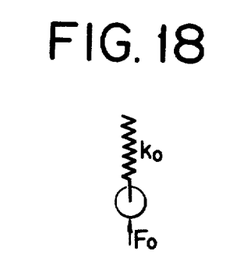
FIG. 18 is a schematic explanational view of a rigid suspension.
Figure 19A:
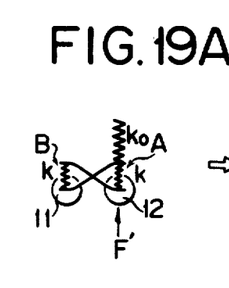
FIGS. 19A to 19C are schematic explanational views of a flexible suspension system of the present invention wherein loads are imposed on one of the rollers.
Figure 19B:
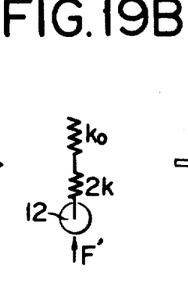
Figure 19C:
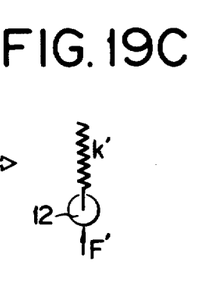

A rigid suspension system is shown in FIG. 18, while flexible suspension systems are shown in FIGS. 19A, 19B and 19C.

In the similar manner as in the aforementioned case, the following equation is obtained.

$$F_o = \sqrt{2 K_o E}$$

$$F' = \sqrt{2 k' E}$$

Where $k_o$ and $F_o$ are a spring constant and a load, respectively, in the case of the rigid suspension, while $K'$ and $F'$ are a spring constant and a load, respectively, in the case of the flexible suspension, and E is an impact energy.

The suspension system of FIG. 19A can be set to be equivalent to those of FIGS. 19B and 19C. The spring constant in the arrangement of FIG. 19C is k' which is the spring constant of the flexible suspension system.

From FIGS. 19B and 19C, the following equation is obtained.

$$k' = \frac{1}{\frac{1}{k_o} + \frac{1}{2k}} = \frac{2 k k_o}{2k + k_o} \quad \text{⑤}$$

$$\frac{F'}{F_o} = \sqrt{\frac{k'}{k_o}}$$

Substitution of the equation ⑤ in the above equation gives the following equation.

$$\frac{F'}{F_o} = \sqrt{\frac{2k}{2k + k_o}} = \alpha$$

α is a load reduction rate of the flexible susension relative to the rigid suspension.

$$2k = \alpha^2 (2k + k_o)$$

$$\therefore k = \frac{\alpha^2}{2(1 - \alpha^2)} k_o$$

If, in the similar manner as in the case of the prior art system, substitution of α = 0.7 in the above equation gives the following equation.

$$k = 0.48 k_o \quad \text{⑥}$$

$$F' = 0.7 F_o$$

5. Load exerted uniformly on the two rollers 11 and 12 (which is referred to as "case 1" below.)

Figure 20:
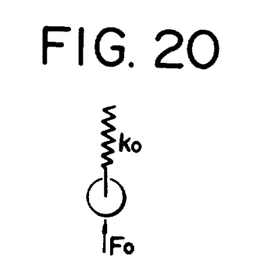
FIG. 20 is a schematic explanational view of a rigid suspension.
Figure 21A:
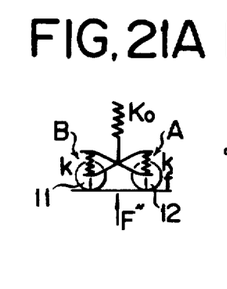
FIGS. 21A to 21C are schematic explanational views of a flexible suspension system of the present invention wherein loads are imposed evenly on both rollers.
Figure 21B:
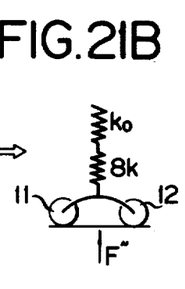
Figure 21C:
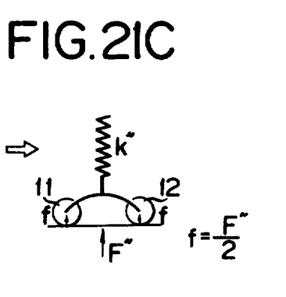

A rigid suspension system is shown in FIG. 20, while flexible suspension systems are shown in FIGS. 21A, 21B and 21C.

$$\frac{F'}{F_o} = \sqrt{\frac{k''}{k_o}}$$

Where $k''$ and $F''$ are a spring constant and a load, respectively, in the case of the flexible suspension system.

Since the suspension system of FIG. 21A can be set to be equivalent to those of FIGS. 21B and 21C, the following equation is obtained.

$$k'' = \frac{1}{\frac{1}{K_o} + \frac{1}{8k}} = \frac{8 k k_o}{8k + k_o} \quad \text{⑦}$$

$$\therefore \frac{F'}{F_o} = \sqrt{\frac{8k}{8k + k_o}}$$

Substitution of the equation ⑥ in the above equation gives the following equation.

$$\frac{F'}{F_o} = 0.891$$

$$F' = 0.891 F$$

$$\therefore f = \tfrac{1}{2} F' = 0.445 F_o$$

A comparison of the load exerted on the roller in the prior art roller suspension system with that in the roller suspension system of the present invention is given in the table below.

TABLE 1

|  | Rigid suspension system | Prior Art suspension system | Suspension system of the present invention |
| --- | --- | --- | --- |
| Case 1 | $F_o$ | 0.413 $F_o$ | 0.445 $F_o$ |
| Case 2 | $F_o$ | 0.947 $F_o$ | 0.7 $F_o$ |
| Case 3 | $F_o$ | 0.7 $F_o$ | 0.7 $F_o$ |

This table indicates that the suspension system of the present invention is superior to that of the prior art suspension system in the case of "Case 2".

It is to be understood that the foregoing description is merely illustrative of a preferred embodiment of the present invention, and that the scope of the invention is not to be limited thereto, but is to be determined by the scope of the appended claims.

What we claim is:

1. A track roller suspension apparatus for a track-type vehicle having a track frame and a track assembly mounted on the track frame, said apparatus comprising:
   a single shaft rotatably mounted on said track frame;
   first arm means rotatably mounted on said shaft, said first arm means having a split roller mounting lower section and a single carrier upper section;
   second arm means rotatably mounted on said shaft, said second arm means having a split roller mounting lower section, a single carrier upper section and an intermediate portion having an opening therethrough, said first and second arm means being arranged crossing each other at said shaft, with said first arm means passing through said opening on said second arm means where they cross;
   first roller means rotatably mounted in the split of the roller mounting lower section of said first arm means;
   second roller means rotatably mounted in the split of the roller mounting lower section of said second arm means;
   first unitary resilient pad means mounted on the lower surface of the upper section of said first arm means;
   second unitary resilient pad means mounted on the upper surface of the roller mounting lower section of said second arm means, said first and second resilient pad means facing each other and being adapted to collide;
   third unitary resilient pad means mounted on the lower surface of the upper section of said second arm means; and
   fourth unitary resilient pad means mounted on the upper surface of the roller mounting lower section of said first arm means, said third and fourth resilient pad means facing each other and being adapted to collide.

2. A track roller suspension apparatus according to claim 1 further comprising a pair of bearing means each fixedly secured to said track frame and wherein said shaft is rotatably mounted on said bearing means.

3. A track roller suspension apparatus according to claim 1 further comprising a pair of stoppers each fixedly secured to said track frame opposite to respective upper faces of the upper sections of said first and second arm means.

* * * * *